United States Patent
Yu et al.

(10) Patent No.: US 11,232,098 B2
(45) Date of Patent: Jan. 25, 2022

(54) DATA STRUCTURE READING METHODS AND APPARATUSES, DATA STRUCTURE UPDATE METHODS AND APPARATUSES, AND ELECTRONIC DEVICES

(71) Applicant: Advanced New Technologies Co., Ltd., Grand Cayman (KY)

(72) Inventors: Benquan Yu, Hangzhou (CN); Zhonghao Lu, Hangzhou (CN); Haizhen Zhuo, Hangzhou (CN); Faqiang Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/159,090

(22) Filed: Jan. 26, 2021

(65) Prior Publication Data

US 2021/0149883 A1    May 20, 2021

Related U.S. Application Data

(63) Continuation of application No. PCT/CN2019/114435, filed on Oct. 30, 2019.

(30) Foreign Application Priority Data

Dec. 20, 2018 (CN) .......................... 201811564698.4

(51) Int. Cl.
*G06F 16/23* (2019.01)
*G06F 16/22* (2019.01)
*G06F 16/25* (2019.01)

(52) U.S. Cl.
CPC ...... *G06F 16/2379* (2019.01); *G06F 16/2272* (2019.01); *G06F 16/258* (2019.01)

(58) Field of Classification Search
CPC . H04L 2209/38; H04L 9/0643; H04L 67/104; H04L 2209/56; H04L 9/30;
(Continued)

(56) References Cited

U.S. PATENT DOCUMENTS 10,158,479 B2 * 12/2018 Chapman ................. G06F 8/71
2015/0379510 A1 * 12/2015 Smith ................ G06Q 20/3829
705/71
(Continued)

FOREIGN PATENT DOCUMENTS

CN   102361476   2/2012
CN   102571657   7/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Cheyne D Ly
(74) *Attorney, Agent, or Firm* — Fish & Richardson P.C.

(57) ABSTRACT

A computer-implemented method includes: obtaining, by a blockchain node, an invoking request for a first smart contract based on receiving a data structure update transaction, where the transaction comprises an input parameter indicating an updated data structure. The updated data structure that is based on a computer programming language is obtained. The first smart contract is run, comprising: parsing the updated data structure and converting the updated data structure characterized by the computer programming language into updated metadata characterized by a definition description language. A second smart contract comprising pre-update metadata and data is invoked using the updated metadata as input parameters. The second smart
(Continued)

contract is run, comprising: replacing the pre-update metadata with the updated metadata, parsing the updated metadata in the second smart contract, and updating a pre-update data structure of the data in the second smart contract based on a parsing result.

20 Claims, 5 Drawing Sheets

(58) Field of Classification Search
CPC ... H04L 9/0637; H04L 9/3236; H04L 9/3265; G06Q 20/065; G06Q 20/38215; G06Q 20/0655; G06Q 20/223; G06Q 20/3823; G06Q 20/389; G06Q 20/00; G06C 20/389; G06F 9/466; G06F 16/2379; G06F 16/2272; G06F 16/258; G06F 16/9024; G06F 16/23; G06F 16/27
See application file for complete search history.

(56) References Cited

U.S. PATENT DOCUMENTS

| | | | |
|---|---|---|---|
| 2015/0381220 A1 | 12/2015 | Gal et al. | |
| 2016/0092988 A1* | 3/2016 | Letourneau | G06Q 20/363 705/66 |
| 2016/0203496 A1* | 7/2016 | Guerrero | G06Q 30/0185 705/39 |
| 2016/0300234 A1* | 10/2016 | Moss-Pultz | H04L 9/3263 |
| 2016/0323109 A1* | 11/2016 | McCoy | G06Q 20/1235 |
| 2016/0330027 A1* | 11/2016 | Ebrahimi | G06F 21/34 |
| 2017/0011460 A1* | 1/2017 | Molinari | G06F 21/645 |
| 2017/0186057 A1* | 6/2017 | Metnick | G06Q 20/02 |
| 2017/0279774 A1* | 9/2017 | Booz | G06Q 20/123 |
| 2017/0330174 A1* | 11/2017 | Demarinis | G06F 21/62 |
| 2017/0345011 A1* | 11/2017 | Salami | G06Q 20/10 |
| 2018/0089758 A1* | 3/2018 | Stradling | G06F 12/1408 |
| 2018/0137465 A1* | 5/2018 | Batra | G06Q 10/103 |
| 2018/0218176 A1* | 8/2018 | Voorhees | H04L 9/3213 |
| 2018/0218343 A1* | 8/2018 | Kolb | G06Q 20/405 |
| 2018/0343114 A1* | 11/2018 | Ben-Ari | H04L 9/06 |
| 2018/0349621 A1 | 12/2018 | Schvey et al. | |
| 2019/0080392 A1* | 3/2019 | Youb | G06F 21/64 |
| 2020/0005285 A1* | 1/2020 | Jimenez-Delgado | G06Q 20/0658 |

FOREIGN PATENT DOCUMENTS

| | | |
|---|---|---|
| CN | 103609018 | 2/2014 |
| CN | 104580044 | 4/2015 |
| CN | 106778329 | 5/2017 |
| CN | 107807991 | 3/2018 |
| CN | 108718341 | 10/2018 |
| CN | 108769173 | 11/2018 |
| CN | 108848119 | 11/2018 |
| CN | 108876619 | 11/2018 |
| CN | 108921558 | 11/2018 |
| CN | 110032599 | 7/2019 |
| EP | 3236374 | 10/2017 |
| TW | 201837798 | 10/2018 |
| WO | WO 2018149504 | 8/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/114435, dated Mar. 4, 2020, 8 pages (with partial English translation).

PCT International Preliminary Report on Patentability in International Application No. PCT/CN2019/114435, dated Jun. 16, 2021, 11 pages (with English translation).

PCT International Search Report and Written Opinion in International Application No. PCT/CN2019/114435, dated Jan. 23, 2020, 15 pages (with partial English translation).

EP Extended Search Report in European Application No. 19898395.9, dated Sep. 24, 2021, 7 pages.

* cited by examiner

DATA STRUCTURE READING METHODS AND APPARATUSES, DATA STRUCTURE UPDATE METHODS AND APPARATUSES, AND ELECTRONIC DEVICES

CROSS-REFERENCE TO RELATED APPLICATIONS

This application is a continuation of PCT Application No. PCT/CN2019/114435, filed on Oct. 30, 2019, which claims priority to Chinese Patent Application No. 201811564698.4, filed on Dec. 20, 2018, and each application is hereby incorporated by reference in its entirety.

TECHNICAL FIELD

One or more embodiments of the present specification relate to the field of blockchain technologies, and in particular, to data structure reading methods and apparatuses, data structure update methods and apparatuses, and electronic devices.

BACKGROUND

A blockchain technology (also referred to as a distributed ledger technology) is a decentralized distributed database technology characterized by decentralization, openness, transparency, tamper resistance, and trustworthiness, and can be applied to many application scenarios that highly rely on data reliability.

SUMMARY

In view of this, one or more embodiments of the present specification provide data structure reading methods and apparatuses, data structure update methods and apparatuses, and electronic devices.

To achieve the previous objective, one or more embodiments of the present specification provide the following technical solutions:

According to a first aspect of one or more embodiments of the present specification, a data structure reading method is proposed, including: a blockchain node in a blockchain network obtains an invoking request for a first smart contract; in response to the invoking request, the blockchain node runs contract code included in the first smart contract to parse a data structure described by metadata included in a second smart contract and to characterize the data structure by using a computer programming language; and the blockchain node returns the data structure characterized by the computer programming language to an initiator of the invoking request.

According to a second aspect of one or more embodiments of the present specification, a data structure update method is proposed, including: a blockchain node in a blockchain network obtains an invoking request for a first smart contract; the blockchain node obtains an updated data structure that is based on a computer programming language; and in response to the invoking request, the blockchain node runs first contract code included in the first smart contract, where the first contract code is used to parse the updated data structure, and to characterize the updated data structure as updated metadata that is based on a definition description language, so as to update pre-update metadata included in a second smart contract.

According to a third aspect of one or more embodiments of the present specification, a data structure reading apparatus is proposed, including: an acquisition unit, configured to enable a blockchain node in a blockchain network to obtain an invoking request for a first smart contract; a response unit, configured to, in response to the invoking request, enable the blockchain node to run contract code included in the first smart contract to parse a data structure described by metadata included in a second smart contract and to characterize the data structure by using a computer programming language; and a returning unit, configured to enable the blockchain node to return the data structure characterized by the computer programming language to an initiator of the invoking request.

According to a fourth aspect of one or more embodiments of the present specification, a data structure update apparatus is proposed, including: a request acquisition unit, configured to enable a blockchain node in a blockchain network to obtain an invoking request for a first smart contract; a structure acquisition unit, configured to enable the blockchain node to obtain an updated data structure that is based on a computer programming language; and a request response unit, configured to, in response to the invoking request, enable the blockchain node to run first contract code included in the first smart contract, where the first contract code is used to parse the updated data structure, and characterize the updated data structure as updated metadata that is based on a definition description language, so as to update pre-update metadata included in a second smart contract.

According to a fifth aspect of one or more embodiments of the present specification, an electronic device is proposed, including: a processor; and a memory, configured to store an instruction executable by the processor, where the processor is configured to implement the data structure reading method according to any one of the previous embodiments.

According to a sixth aspect of one or more embodiments of the present specification, an electronic device is proposed, including: a processor; and a memory, configured to store an instruction executable by the processor, where the processor is configured to implement the data structure update method according to any one of the previous embodiments.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the example embodiments below do not represent all implementations consistent with one or more embodiments of the present specification. On the contrary, the implementations are only examples of apparatuses and methods that are described in the appended claims in detail and consistent with some aspects of one or more embodiments of the present specification.

Notably, steps of a corresponding method in another embodiment are not necessarily performed in a sequence shown and described in the present specification. In some other embodiments, the method can include more or less steps than steps described in the present specification. In addition, a single step described in the present specification may be divided into multiple steps for description in other embodiments; and multiple steps described in the present specification may be combined into a single step for description in other embodiments.

Figure 1:
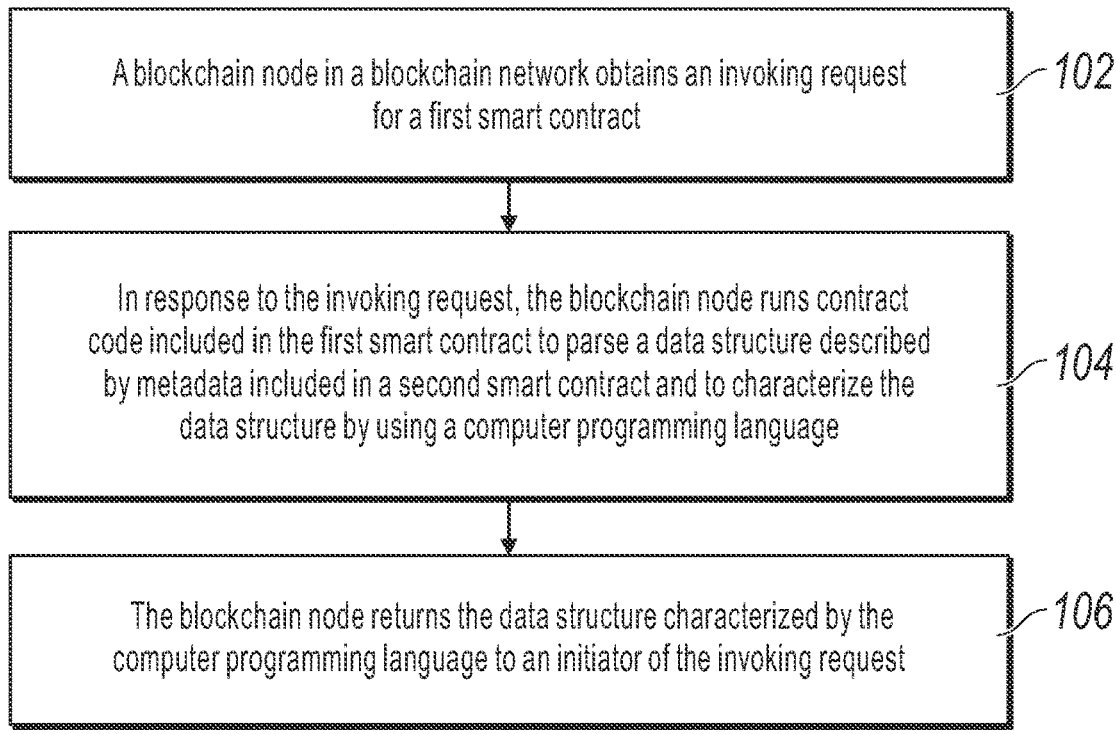
FIG. 1 is a flowchart illustrating a data structure reading method, according to some example embodiments.

FIG. 1 is a flowchart illustrating a data structure reading method, according to some example embodiments. As shown in FIG. 1, the method can include the following steps.

Step 102: A blockchain node in a blockchain network obtains an invoking request for a first smart contract.

In some embodiments, the invoking request can be included in a transaction created in the blockchain network. By specifying a contract address and port information, etc. of the first smart contract that needs to be invoked in the transaction, the invoking request can be identified as "dedicated to" the above-mentioned first smart contract, so that contract code included in the first smart contract can be run.

In some embodiments, a transaction (transaction) described in the present specification refers to a piece of data that is created by using a client device corresponding to a blockchain node and that needs to be finally published to a distributed database of the blockchain network. A transaction in a blockchain network can be a transaction in a narrow sense and a transaction in a broad sense. A transaction in the narrow sense refers to a value transfer published to a blockchain network. For example, in a conventional bitcoin blockchain network, a transaction can be a transfer initiated in the blockchain network. A transaction in the broad sense refers to a piece of service data that is published to a blockchain network and that has a service intention. For example, an operator can establish a consortium blockchain based on actual service needs, and deploy some other types of online services (for example, a house rental service, a vehicle dispatch service, an insurance claims service, a credit service, and a medical service) that are unrelated to a value transfer in the consortium blockchain. In such a consortium blockchain, a transaction can be a service message or a service request that is published in the consortium blockchain and that has a service intention.

In some embodiments, an initiator of the invoking request can include a certain role in the blockchain network. For example, the role can include a developer or a common user in the blockchain network. The role can quickly read a data structure of data included in a second smart contract by invoking the first smart contract.

In some embodiments, a consensus on the first smart contract has been reached by blockchain nodes in the blockchain network, and the first smart contract has been recorded in the blockchain network for invoking by the blockchain nodes.

In some embodiments, the first smart contract can be a system contract provided by a system function of the blockchain network. For example, the first smart contract can be written to source code of the blockchain network, so that the first smart contract can be used as a predetermined "tool" and the blockchain node can invoke the first smart contract. For example, the first smart contract can be used to read the data structure of the data included in the second smart contract. However, a common user or a common developer cannot modify the first smart contract to ensure reliability of the first smart contract.

Step 104: In response to the invoking request, the blockchain node runs the contract code included in the first smart contract to parse a data structure described by metadata included in a second smart contract and to characterize the data structure by using a computer programming language.

In some embodiments, a role such as a developer can read and edit a computer programming language-based data structure, but metadata is characterized by a definition description language and cannot be directly read or edited. Therefore, the contract code included in the first smart contract can be used to implement a conversion function module between the computer programming language and the definition description language, and parse the metadata characterized by the definition description language and further convert the metadata into data characterized by the computer programming language, so that the previous role can conveniently read the data structure of the data included in the second smart contract.

In some embodiments, the first smart contract can include a code structure, and the code structure includes the previous contract code. The second smart contract can include a storage structure, and the storage structure is used to record a data set and metadata. The first smart contract can also include a storage structure or other structures to record corresponding data or other content. Implementations are not limited in the present specification. The second smart contract can also include a code structure, and the code structure is used to record contract code. For example, after the contract code is run, metadata included in the second smart contract can be parsed, so as to implement a read and write operation and an update operation, etc. on the data included in the second smart contract. Implementations are not limited in the present specification.

In some embodiments, the data structure can include data fields, a hierarchical relationship between the data fields, and a value relationship between the data fields, etc. Implementations are not limited in the present specification.

Step 106: The blockchain node returns the data structure characterized by the computer programming language to an initiator of the invoking request.

In some embodiments, the computer programming language can include a language of a predetermined type. For example, the Solidity language, the JavaScript language, the Python language, or even a hybrid language can be predetermined as the computer programming language. Implementations are not limited in the present specification. Cross-contract invoking can further be used to implement invoking between contracts written in different languages. In addition, existing contracts can be rewritten in the same or different languages during contract upgrade, without affecting other contracts. Cross-contract invoking can also implement access to the same data of contracts written in different languages.

In some embodiments, the computer programming language can include a language of a type indicated in the invoking request. In other words, the initiator of the invoking request can specify a type of computer programming language that the initiator intends to use. To be specific, the initiator of the invoking request can specify any type of language or select a type from multiple preconfigured types. Implementations are not limited in the present specification.

Figure 2:
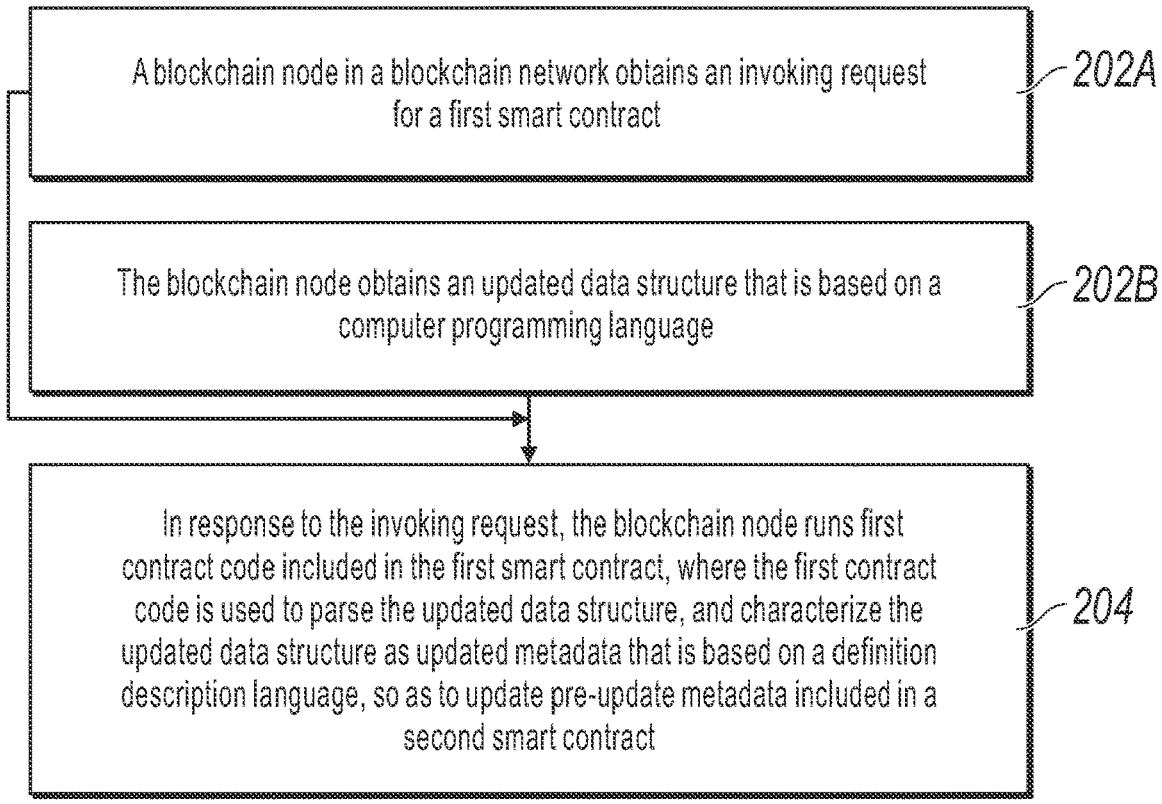
FIG. 2 is a flowchart illustrating a data structure update method, according to some example embodiments.

FIG. 2 is a flowchart illustrating a data structure update method, according to some example embodiments. As shown in FIG. 2, the method can include the following steps.

Step 202A: A blockchain node in a blockchain network obtains an invoking request for a first smart contract.

In some embodiments, the invoking request can be included in a transaction created in the blockchain network. By specifying a contract address and port information, etc. of the first smart contract that needs to be invoked in the transaction, the invoking request can be identified as "targeted for" the above-mentioned first smart contract, so that first contract code included in the first smart contract can be run.

In some embodiments, a transaction (transaction) described in the present specification refers to a piece of data that is created by using a client device corresponding to a blockchain node and that needs to be finally published to a distributed database of the blockchain network. A transaction in a blockchain network can be a transaction in a narrow sense and a transaction in a broad sense. A transaction in the narrow sense refers to a value transfer published to a blockchain network. For example, in a conventional bitcoin blockchain network, a transaction can be a transfer initiated in the blockchain network. A transaction in the broad sense refers to a piece of service data that is published to a blockchain network and that has a service intention. For example, an operator can establish a consortium blockchain based on actual service needs, and deploy some other types of online services (for example, a house rental service, a vehicle dispatch service, an insurance claims service, a credit service, and a medical service) that are unrelated to a value transfer in the consortium blockchain. In such a consortium blockchain, a transaction can be a service message or a service request that is published in the consortium blockchain and that has a service intention.

In some embodiments, an initiator of the invoking request can include a certain role in the blockchain network. For example, the role can include a developer, a maintenance engineer, a common user, or an authorized user in the blockchain network. The role can conveniently update a data structure of data included in a second smart contract or conveniently access or update the data included in the second smart contract by invoking the first smart contract.

In some embodiments, a consensus on the first smart contract has been reached by blockchain nodes in the blockchain network, and the first smart contract has been recorded in the blockchain network for invocation by the blockchain nodes.

In some embodiments, the first smart contract can be a system contract provided by a system function of the blockchain network. For example, the first smart contract can be written to source code of the blockchain network, so that the first smart contract can be used as a predetermined "tool" and the blockchain node can invoke the first smart contract. For example, the first smart contract can be used to update metadata included in the second smart contract so as to further modify the data structure of the data included in the second smart contract. However, a common user or a common developer cannot modify the first smart contract to ensure reliability of the first smart contract.

Step 202B: The blockchain node obtains an updated data structure that is based on a computer programming language.

In some embodiments, a developer can read the data structure of the data included in the second smart contract through the implementation shown in FIG. 1, and can update the data structure based on a computer programming language to obtain an updated data structure.

In some embodiments, the computer programming language can include a language of a predetermined type. For example, the Solidity language, the JavaScript language, or the Python language, etc. can be predetermined as the computer programming language. Implementations are not limited in the present specification.

In some embodiments, the data structure can include data fields, a hierarchical relationship between the data fields, and a value relationship between the data fields, etc. Implementations are not limited in the present specification.

In some embodiments, there is no definite sequential order between step 202A and step 202B, insofar as the steps are performed before step 204. Implementations are not limited in the present specification.

Step 204: In response to the invoking request, the blockchain node runs first contract code included in the first smart contract, where the first contract code is used to parse the updated data structure, and characterize the updated data structure as updated metadata that is based on a definition description language, so as to update pre-update metadata included in a second smart contract.

In some embodiments, a role such as a developer can read and edit a computer programming language-based data structure, but metadata is characterized by a definition description language and cannot be directly read or edited. Therefore, the first contract code included in the first smart contract can be used to implement a conversion function module between the computer programming language and the definition description language, and parse the metadata characterized by the definition description language and further convert the metadata into data characterized by the computer programming language, so that the previous role can update the data structure of the data by using the computer programming language and conveniently update the updated data structure into the metadata included in the second smart contract by using the first smart contract, so as to update the data structure of the data included in the second smart contract by using the updated metadata. As such, a role such as a developer can quickly read and modify the data structure of the data included in the second smart contract in a development phase or a maintenance phase.

In some embodiments, the first smart contract can include a code structure, and the code structure includes the previous first contract code. The first smart contract can also include a storage structure or other structures to record corresponding data or other content. Implementations are not limited in the present specification. The second smart contract can include a code structure, and the code structure includes the previous second contract code. The second smart contract can further include a storage structure, and the storage structure is used to record a data set and metadata. If the pre-update metadata included in the second smart contract is updated as the updated metadata, the previous second contract code can be run to parse the updated metadata included in the second smart contract, so as to determine the updated data structure and update the data structure of the data included in the second smart contract accordingly.

In some embodiments, the first contract code is further used to compare a pre-update data structure corresponding to the pre-update metadata with the updated data structure to verify rationality of the updated data structure, where when the rationality of the updated data structure is successfully verified, the updated metadata is used to update the pre-update metadata. For example, assume that the data in the second smart contract includes fields such as an account ID, an age, and a telephone number, etc., and uses "01" to represent the account ID, "02" to represent the age, and "03" to represent the telephone number in a record. In this case, if "02" is changed to represent the telephone number but "03" is still used to represent the telephone number in an updated data structure, disorder about the telephone number field occurs, resulting in an improper updated data structure. Directly updating the pre-update metadata should be reduced. Instead, an alarm should be reported to an invoker (such as a developer) of the first smart contract to prompt the invoker to perform modification.

Figure 3:
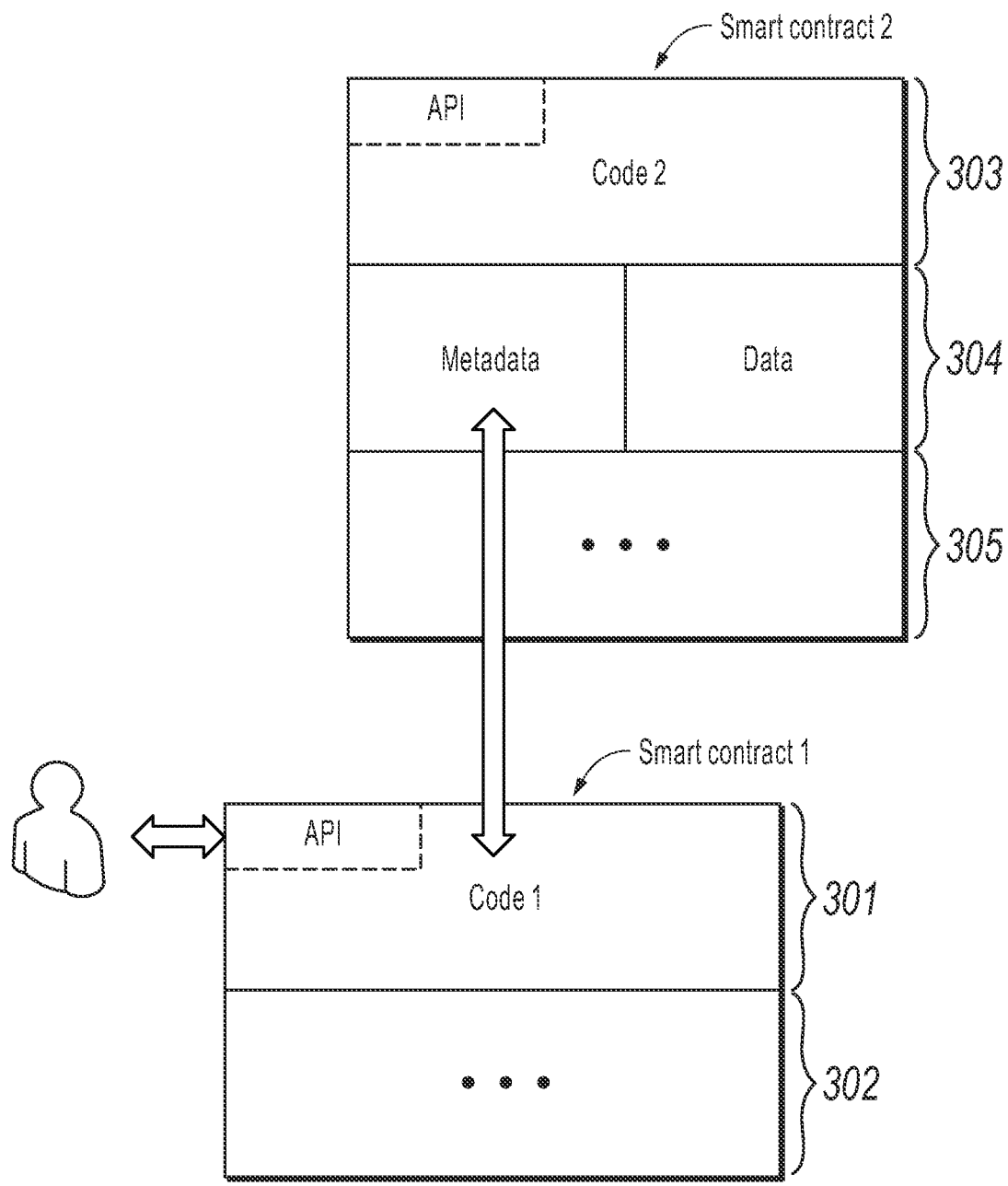
FIG. 3 is a schematic structural diagram illustrating a smart contract, according to some example embodiments.

FIG. 3 is a schematic structural diagram illustrating a smart contract, according to some example embodiments. As shown in FIG. 3, the present specification relates to smart contract 1 and smart contract 2. Smart contract 1 can include structure 301. For example, structure 301 can be referred to as a code structure, and is used to record contract code (referred to as code 1 for short) of smart contract 1. Smart contract 1 can further include other structures 302, such as a storage structure, a balance structure, and a nonce structure in related technologies. Implementations are not limited in the present specification. Smart contract 2 can include structure 303. For example, structure 303 can be referred to as a code structure, and is used to record contract code (referred to as code 2 for short) of smart contract 2. Smart contract 2 can include structure 304. For example, structure 304 can be referred to as a storage structure, and is used to record contract data (referred to as data for short) of smart contract 2 and metadata corresponding to the contract data, where the metadata is used to describe corresponding contract data. Smart contract 2 can further include other structures 305, such as a balance structure and a nonce structure in related technologies. Implementations are not limited in the present specification.

Smart contract 1 can provide to an external system, an application-programming interface (API) for code 1 in structure 301 so as to invoke code 1. In addition, smart contract 2 can provide to an external system an API for code 2 in structure 303 so as to invoke code 2. In some embodiments of the present specification, an engineer can invoke code 1 included in smart contract 1 by using the API provided by smart contract 1. After code 1 is run, code 2 can be invoked by using the API provided by smart contract 2 to parse or update metadata included in smart contract 2, and accordingly read or update a data structure used for the data included in smart contract 2.

In the technical solutions of the present specification, assume that user A (for example, user A is a developer) develops or maintains smart contract 2. Because the metadata in smart contract 2 is described by using a definition description language, and an engineer is adept at developing or maintaining smart contract 2 by using a computer programming language, smart contract 1 described above can be converted between the definition description language and the computer programming language, thereby helping the engineer conveniently develop or maintain the metadata included in smart contract 2 by invoking smart contract 1, so as to further read or update the data structure of the data included in smart contract 2.

Figure 4:
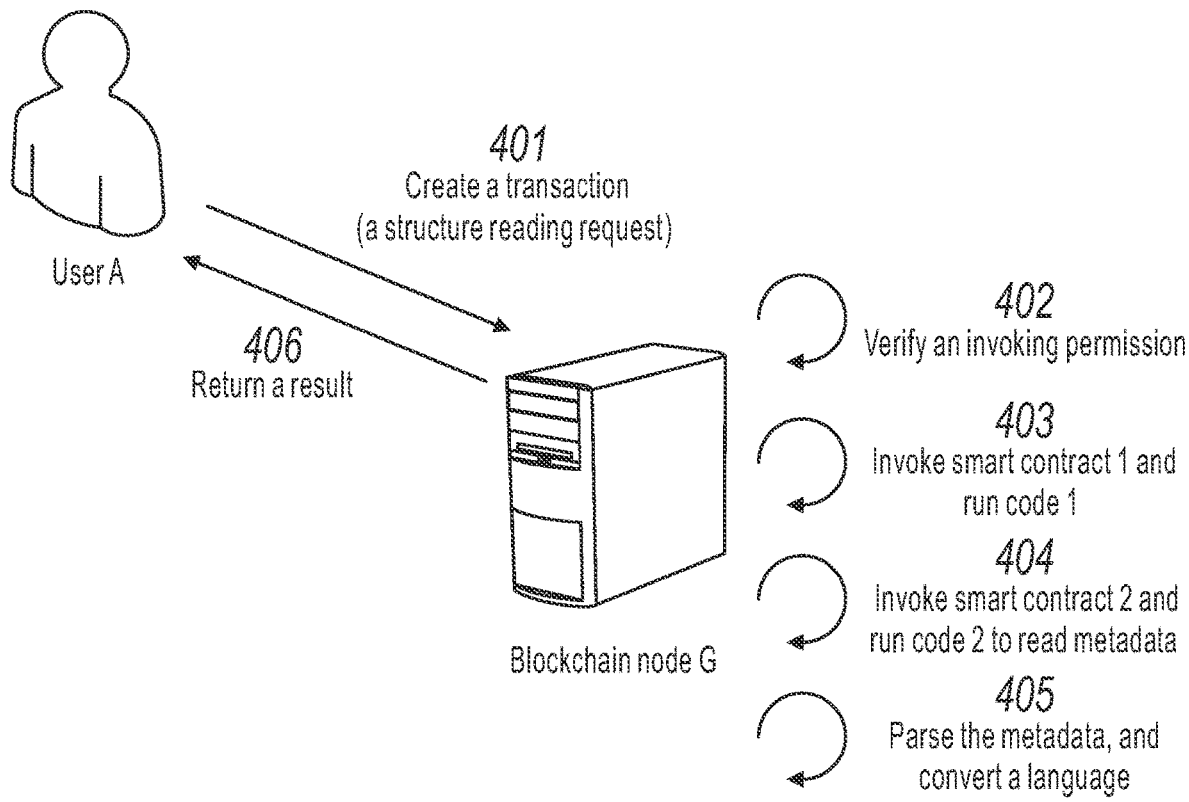
FIG. 4 is a schematic diagram illustrating data structure reading, according to some example embodiments.

FIG. 4 is a schematic diagram illustrating data structure reading, according to some example embodiments. As shown in FIG. 4, a process of reading a data structure can include the following steps:

Step 401: Create a transaction.

In some embodiments, assume that user A needs to read the data structure of the data included in smart contract 2 to modify the data structure. Therefore, user A can create a data structure reading transaction (which is equivalent to a data structure reading request) and publish the transaction to the blockchain network. Assume that blockchain node G responds to the previous transaction published by user A. Blockchain node G is generally a blockchain node closest to user A. Certainly, implementations are not limited in the present specification.

In some embodiments, based on the embodiment shown in FIG. 3, the metadata included in smart contract 2 records a data structure of related data, and smart contract 1 allows for conversion between the definition description language used by the metadata and a computer programming language well known to user A. Therefore, user A can invoke smart contract 1 by using the previous transaction, so that smart contract 1 can be used to process the metadata included in smart contract 2 to determine the data structure of the data included in smart contract 2.

In some embodiments, many smart contracts can exist in a blockchain network for implementing corresponding events or purposes. Therefore, the previous transaction can include a contract address and port information, etc. of smart contract 1. As such, blockchain node G can determine, based on the contract address, that the transaction needs to invoke smart contract 1, and invoke, based on the port information, code 1 included in smart contract 1.

In some embodiments, after being created and published to the blockchain network, a consensus on smart contract 1 is reached between blockchain nodes in the blockchain network, and smart contract 1 is recorded on each blockchain node. For example, smart contract 1 is also recorded on blockchain node G described above. Similarly, after being created and published to the blockchain network, smart contract 2 can also be established in blockchain node G based on a consensus.

In some embodiments, smart contract 1 can be configured as a basic function provided by the blockchain network. For example, smart contract 1 can be written to source code of the blockchain network instead of being generated based on the consensus of each blockchain node, making smart contract 1 more secure and reliable.

Step 402: Blockchain node G verifies an invoking permission of user A for smart contract 1.

In some embodiments, smart contract 1 can set an invoking permission in a form similar to a whitelist or a blacklist to reduce unauthorized reading or modification on metadata of other smart contracts by using smart contract 1, thereby preventing security risks. For example, when the blockchain network belongs to a public blockchain, users with the invoking permission can be a predetermined group of users. For another example, when the blockchain network belongs to a consortium blockchain, users with the invoking permission can be consortium members. Therefore, when blockchain node G obtains the transaction published by user A and determines that the transaction needs to invoke smart contract 1, blockchain node G can first determine whether user A has the corresponding invoking permission, and continue a subsequent step when user A has the permission. Otherwise, blockchain node G can return failure information.

Step 403: Blockchain node G invokes smart contract 1 to run code 1 included in smart contract 1.

In some embodiments, user A can add input parameters for smart contract 1 to the previous transaction. For example, the input parameters can include a contract address and port information, etc. of smart contract 2, so that when code 1 included in smart contract 1 is run, smart contract 2 can be invoked accordingly.

In some embodiments, the input parameters added by user A to the previous transaction can further include an operation type. For example, the operation type can include "metadata reading". As such, when code 1 included in smart contract 1 is run, based on invoking of smart contract 2, the metadata included in smart contract 2 can be read, the metadata based on the definition description language can be parsed, and a parsed data structure can be characterized in a computer programming language and be provided to user A for viewing.

Step 404: Blockchain node G invokes smart contract 2 and runs code 2 to read metadata.

In some embodiments, blockchain node G can invoke smart contract 2 based on code 1 that is run above. For example, above-mentioned code 2 included in smart contract 2 can be invoked and run to read the metadata included in smart contract 2 and return the metadata to smart contract 1.

In some embodiments, smart contract 2 can set an invoking permission in a form similar to a whitelist or a blacklist to reduce unauthorized invoking of smart contract 2 and reduce unauthorized reading or modification on the metadata or the data included in smart contract 2, thereby preventing security risks. For example, when the blockchain network belongs to a public blockchain, users with the invoking permission can be a predetermined group of users. For another example, when the blockchain network belongs to a consortium blockchain, users with the invoking permission can be consortium members. Therefore, when smart contract 1 is invoked by user A to initiate invoking of smart contract 2, it can be determined whether user A has the invoking permission for smart contract 2, and a subsequent step can be continued when user A has the invoking permission. Otherwise, failure information can be returned.

Notably, based on a feature of distributed data storage of a blockchain network, data published to the blockchain network needs to be recorded on all blockchain nodes, so that the data cannot be tampered with and is traceable. However, for some data that may be private to some extent, privacy cannot be ensured if the data is published to the blockchain network. However, if the data is not published to the blockchain network, the data can be unreliable and it is not conducive for each blockchain node to conveniently read and invoke a data structure of related data. Therefore, in the present specification, the previous data and its metadata with a privacy need are recorded in a smart contract (for example, smart contract 2), and unauthorized access to related data and its metadata by unauthorized users can be limited through management of invoking permissions. As such, the data and its metadata can be published to the blockchain network to ensure reliability and convenience brought by the blockchain network while sufficient privacy and security are ensured for the data and its metadata.

Step 405: Blockchain node G parses the metadata and implements language conversion on the metadata.

In some embodiments, for the metadata returned for smart contract 2, code 1 that is run above can further be used to parse the metadata that is based on the definition description language, and characterize a parsed data structure in a computer programming language and provide the parsed data structure to user A for viewing.

In some embodiments, user A can add input parameters for smart contract 1 to the previous transaction. For example, the input parameters can include a type of computer programming language, that is, user A can specify a certain type of computer programming language based on the input parameters. As such, after code 1 included in smart contract 1 is run, the parsed data structure can be characterized in the type of computer programming language, so that user A can view or edit the parsed data structure.

In some embodiments, a data structure in the present specification can include data fields involved in data, a hierarchical relationship between the data fields, and a value relationship between the data fields, etc. Any information that can be used to describe the data included in smart contract 2 can be provided to user A as the data structure here.

In some embodiments, the input parameters added by user A to the previous transaction can include types of data structures, for example, several types of data structures concerned by user A. As such, after code 1 included in smart contract 1 is run, these types of data structures can be selected and provided to user A, while other types of data structures may not be provided to user A. With such practice, the data structures viewed by user A are more targeted and better satisfy actual needs of user A, without a process of parsing and characterizing the other types of data structures, thereby helping improve reading efficiency of the data structures.

Step 406: Blockchain node G returns a processing result to user A.

User A can update the data structure of the data included in smart contract 2. For example, after reading a pre-update data structure of the data included in smart contract 2 by using the embodiment shown in FIG. 4, user A can modify the pre-update data structure to obtain an updated data structure, update the metadata included in smart contract 2 based on the updated data structure, and then update a data structure of corresponding data based on the updated metadata. Certainly, user A can alternatively obtain the pre-update data structure of the data included in smart contract 2 in other ways. Implementations are not limited in the present specification.

Figure 5:
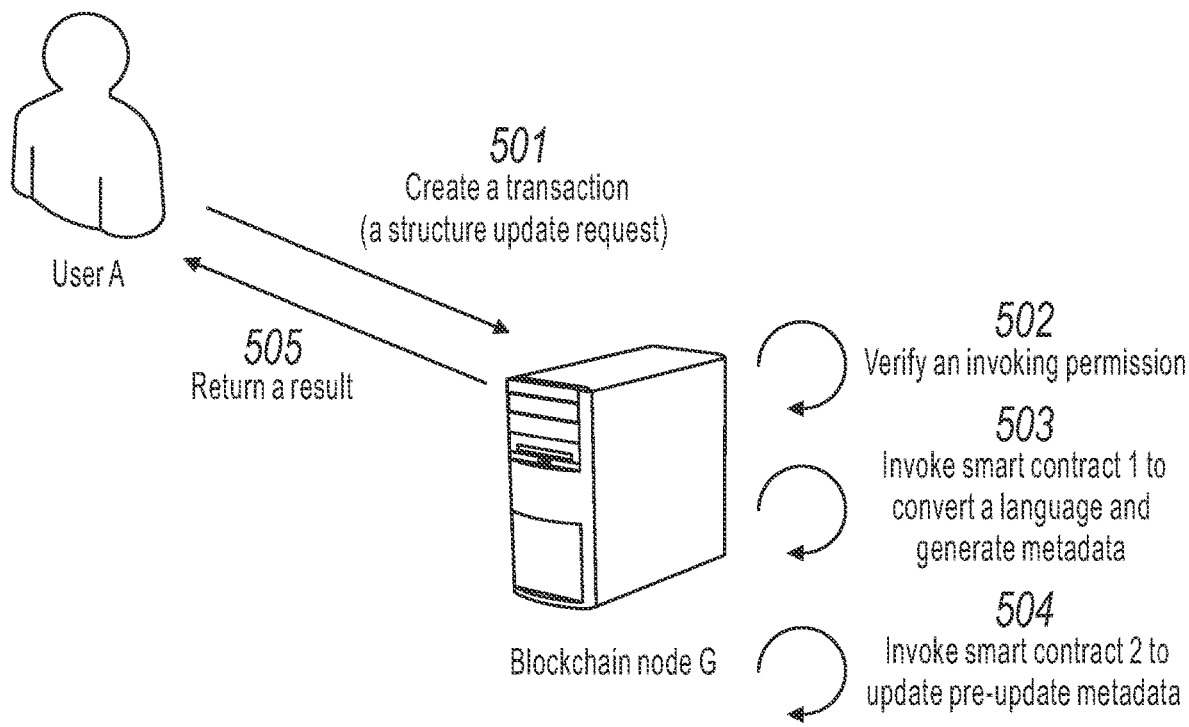
FIG. 5 is a schematic diagram illustrating a data structure update, according to some example embodiments.

Correspondingly, FIG. 5 is a schematic diagram illustrating a data structure update, according to some example embodiments. As shown in FIG. 5, a process of updating a data structure can include the following steps:

Step 501: Create a transaction.

In some embodiments, assuming that user A needs to update the data structure of the data included in smart contract 2, user A can create a data structure update transaction (which is equivalent to a structure update request), and publish the transaction to a blockchain network. Assume that blockchain node G responds to the previous transaction published by user A. Blockchain node G is generally a blockchain node closest to user A. Certainly, implementations are not limited in the present specification.

In some embodiments, based on the embodiment shown in FIG. 3, user A can modify the pre-update data structure used by the data included in smart contract 2 to obtain the updated data structure. The updated data structure is characterized in a computer programming language well known to user A. Smart contract 1 described above allows for conversion between the computer programming language characterizing the updated data structure and the definition description language used for the metadata, so as to obtain updated metadata and update the data structure of the data included in smart contract 2 accordingly.

In some embodiments, the previous transaction can include a contract address and port information, etc. of smart contract 1. As such, blockchain node G can determine, based on the contract address, that the transaction needs to invoke smart contract 1, and invoke, based on the port information, code 1 included in smart contract 1.

In some embodiments, for smart contract 1 in the embodiments, reference can be made to related descriptions in the embodiment shown in FIG. 4. Details are omitted here for simplicity.

Step 502: Blockchain node G verifies an invoking permission of user A for smart contract 1.

In some embodiments, for step 502, reference can be made to step 402 shown in FIG. 4, and details are omitted here for simplicity.

Step 503: Blockchain node G invokes smart contract 1 to implement language conversion on the updated data structure and generate the updated metadata.

In some embodiments, the input parameters added by user A to the previous transaction can include an updated data structure. As such, when code 1 included in smart contract 1 is run, the updated data structure characterized by the computer programming language can be converted to obtain the updated metadata characterized by the definition description language.

In some embodiments, a data structure in the present specification can include data fields involved in data, a hierarchical relationship between the data fields, and a value relationship between the data fields, etc. Any information that can be used to describe the data included in smart contract 2 can be provided to user A as the data structure here.

In some embodiments, a data structure update implemented by user A can involve the data structure in any of the previous aspects. For example, the data structure update can be addition, deletion, or modification of the data fields. For another example, the data structure update can be addition, deletion, or modification of the hierarchical relationship between the data fields. For still another example, the data structure update can be addition, deletion, or modification of the value relationship between the data fields.

The following uses the addition, deletion, or modification of the data fields as an example to describe in detail the data structures before and after the update.

Assume that Table 1 describes the pre-update data structure of the data included in smart contract 2, including personal information (such as an account ID, an age, and an address) of a user owning each account and a status of each account's ownership over each type of blockchain asset.

TABLE 1

| Account ID | Age | Tel | ... | Balance-Type A | Balance-Type B | Total-RMB |
|---|---|---|---|---|---|---|
| 0001 | 26 | 139 ... | ... | 2000 | 1500 | 5000 |
| 0002 | 25 | 186 ... | ... | 1000 | 6000 | 13,000 |
| 0003 | 32 | 166 ... | ... | 20,000 | 2100 | 24,200 |
| ... | ... | ... | ... | ... | ... | ... |

In one case, assume that user A updates the data structure by adding a data field. For example, a new data field "Balance-Type X" is added based on Table 1, and correspondingly, the updated data structure is described in Table 2.

TABLE 2

| Account ID | Age | Tel | ... | Balance-Type A | Balance-Type B | Balance-Type X | Total-RMB |
|---|---|---|---|---|---|---|---|
| 0001 | 26 | 139 ... | ... | 2000 | 1500 | 0 | 5000 |
| 0002 | 25 | 186 ... | ... | 1000 | 6000 | 0 | 13,000 |
| 0003 | 32 | 166 ... | ... | 20,000 | 2100 | 0 | 24,200 |
| ... | ... | ... | ... | ... | ... | ... | ... |

In another case, assume that user A updates the data structure by deleting a data field. For example, an existing data field "Balance-Type X" is deleted from Table 2, and correspondingly, the updated data structure is described in Table 1.

In still another case, assume that user A updates the data structure by modifying a data field. For example, based on Table 1, an existing data field "Total-RMB" is modified to "Total-USD". To be specific, counting the total amount of blockchain assets owned by each account in RMB is changed to counting the total amount of blockchain assets owned by each account in USD. Correspondingly, the updated data structure is described in Table 3.

TABLE 3

| Account ID | Age | Tel | ... | Balance-Type A | Balance-Type B | Total-USD |
|---|---|---|---|---|---|---|
| 0001 | 26 | 139 ... | ... | 2000 | 1500 | 768.9114 |
| 0002 | 25 | 186 ... | ... | 1000 | 6000 | 1999.1696 |
| 0003 | 32 | 166 ... | ... | 20,000 | 2100 | 3721.5311 |
| ... | ... | ... | ... | ... | ... | ... |

In some embodiments, when code 1 included in smart contract 1 is run, the updated data structure can further be verified to determine whether the update implemented by user A is proper. For example, assume that management of the data fields in smart contract 2 is implemented by using "identifiers". For example, identifier "01" is used to represent the "Account ID" field, identifier "02" is used to represent the "Age" field, and identifier "03" is used to represent the "Tel" field. Then, if the "Balance-Type X" field in Table 2 is added to the updated data structure based on Table 1, and identifier "02" is used to represent the "Balance-Type X" field, identifier "02" corresponds to two different fields at the same time, indicating that the update implemented by user A is improper. In this case, prompt information can be returned to user A, and an update operation on the data structure can be suspended or terminated.

Certainly, smart contract 2 can use other methods in addition to the "identifier" based management method. Implementations are not limited in the present specification. For example, smart contract 2 can further use an "offsetting" method. For example, the "Account ID" field is used as a start field, and an offset corresponding to the "account ID" is 0; and the "Age" field is the first field to the right side of the "Account ID" field, and an offset corresponding to the "Age" field relative to the "account ID" is 1. Similarly, an offset corresponding to the "Tel" field relative to the "account ID" is 2. With such practice, the data fields and their location relationships can be managed and rationality of the updated data structure can be determined accordingly. Details are omitted here for simplicity.

Step 504: Blockchain node G invokes smart contract 2 to update the pre-update metadata included in smart contract 2.

In some embodiments, user A can add input parameters for smart contract 1 to the previous transaction. For example, the input parameters can include a contract address and port information, etc. of smart contract 2, so that when code 1 included in smart contract 1 is run, smart contract 2 can be invoked accordingly.

In some embodiments, smart contract 2 can set an invoking permission in a form similar to a whitelist or a blacklist to reduce unauthorized invoking of smart contract 2 and reduce unauthorized reading or modification on the metadata included in smart contract 2, thereby preventing security risks. For example, when the blockchain network belongs to a public blockchain, users with the invoking permission can be a predetermined group of users. For another example, when the blockchain network belongs to a consortium blockchain, users with the invoking permission can be consortium members. Therefore, when smart contract 1 is invoked by user A to initiate invoking of smart contract 2, it can be determined whether user A has the invoking permission for smart contract 2, and a subsequent step can be continued when user A has the invoking permission. Otherwise, failure information can be returned.

Notably, based on a feature of distributed data storage of a blockchain network, data published to the blockchain network needs to be recorded on all blockchain nodes, so that the data cannot be tampered with and is traceable. However, for some data that can be private to some extent, privacy cannot be ensured if the data is published to the blockchain network. However, if the data is not published to the blockchain network, the data can be unreliable and it is not conducive for each blockchain node to conveniently read and invoke a data structure of related data. Therefore, in the present specification, the previous data and its metadata with a privacy need are recorded in a smart contract (for example, smart contract 2), and unauthorized access to related data and its metadata by unauthorized users can be limited through management of invoking permissions. As such, the data and its metadata can be published to the blockchain network to ensure reliability and convenience brought by the blockchain network while sufficient privacy and security are ensured for the data and its metadata.

In some embodiments, after code 1 included in smart contract 1 is run, the generated updated metadata can be used as input parameters for invoking smart contract 2. As such, when code 2 included in smart contract 2 is run, the pre-update metadata originally included in smart contract 2 can be replaced with the updated metadata, so as to update the metadata included in smart contract 2.

Step 505: Blockchain node G returns a processing result to user A.

In some embodiments, because the updated metadata included in smart contract 2 uses the data structure updated by user A, when code 2 included in smart contract 2 is run, the updated metadata can be parsed, and the data included in smart contract 2 can be updated based on a parsing result, thereby finally implementing an update operation on the data structure of the data included in smart contract 2.

In some embodiments, after the metadata included in smart contract 2 is updated, the updated metadata can be parsed by running code 2 included in smart contract 2, and all data included in smart contract 2 can be updated based on a parsing result. For example, when the data structure is updated by modifying the "Total-RMB" field in Table 1 to the "Total-USD" field, the updated data can be described in Table 3.

In some embodiments, after the metadata included in smart contract 2 is updated, data structures of all data included in smart contract 2 may not be updated. Instead, only data structures of related data need to be updated when the related data is involved. For example, after the metadata included in smart contract 2 is updated, the data included in smart contract 2 can still temporarily use the data structure described in Table 1.

TABLE 4

| Account ID | Age | Tel | ... | Balance-Type A | Balance-Type B | Total-RMB | Total-USD |
|---|---|---|---|---|---|---|---|
| 0001 | 26 | 139 ... | ... | 2000 | 1500 | 5000 | / |
| 0002 | 25 | 186 ... | ... | 1000 | 6000 | / | 1999.1696 |
| 0003 | 32 | 166 ... | ... | 20,000 | 2100 | 24,200 | / |
| ... | ... | ... | ... | ... | ... | ... | / |

Assuming that smart contract 2 needs to be invoked to query the total amount of blockchain assets corresponding to the account ID "0002", code 2 included in smart contract 2 can be run to parse the updated metadata included in smart contract 2. Because the updated data structure uses the "Total-USD" field, as described in Table 4, the "Total-USD" field can be added to user information corresponding to the account ID "0002", data "13000" originally corresponding to the "Total-RMB" field can be deleted and "1999.1696" can be specified in the "Total-USD" field, indicating that the total amount of blockchain assets owned by a user corresponding to the account ID "0002" is equal to USD1999.1696. Because only data corresponding to the account ID "0002" is involved, for the present account, it is equivalent to modifying the "Total-RMB" field to the "Total-USD" field while other accounts still use the "Total-RMB" field until related data is involved. Such practice can greatly reduce workload, especially when the quantity of accounts involved is large.

Figure 6:
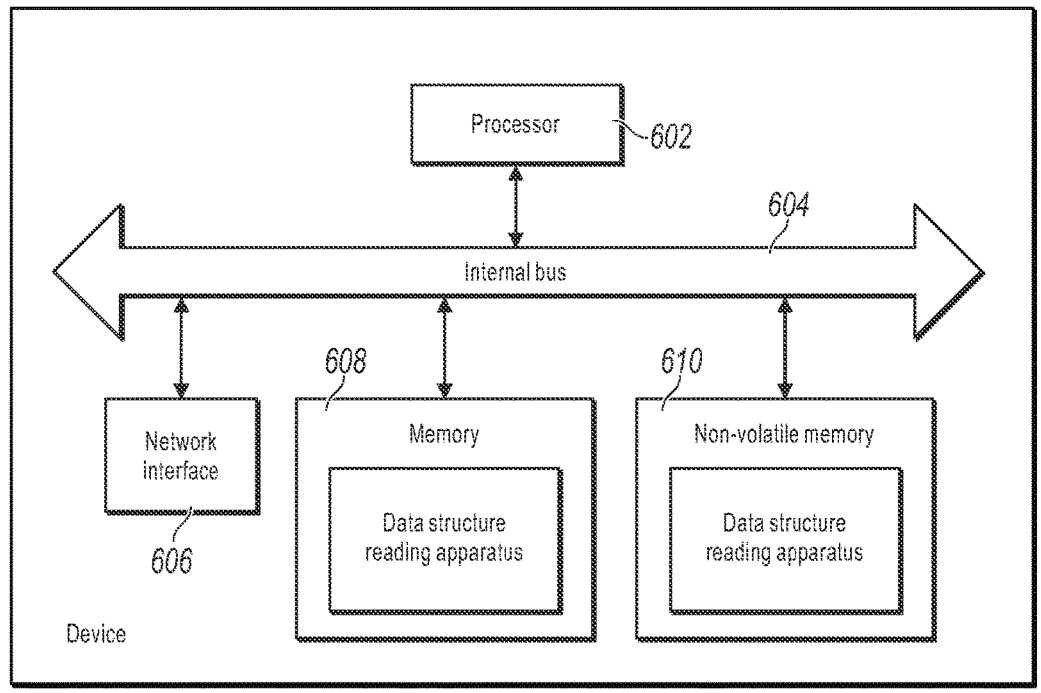
FIG. 6 is a schematic structural diagram illustrating a device, according to some example embodiments.

FIG. 6 is a schematic structural diagram illustrating a device, according to some example embodiments. Referring to FIG. 6, in terms of hardware, the device includes a processor 602, an internal bus 604, a network interface 606, a memory 608, and a non-volatile memory 610, and certainly can further include hardware needed by other services. The processor 602 reads a corresponding computer program from the non-volatile memory 610 to the memory 608 for running, and a data structure reading apparatus is logically formed. Certainly, in addition to a software implementation, one or more embodiments of the present specification do not exclude another implementation, for example, a logic device or a combination of hardware and software. That is, an execution body of the following processing procedure is not limited to each logical unit, and can also be hardware or a logic device.

Figure 7:
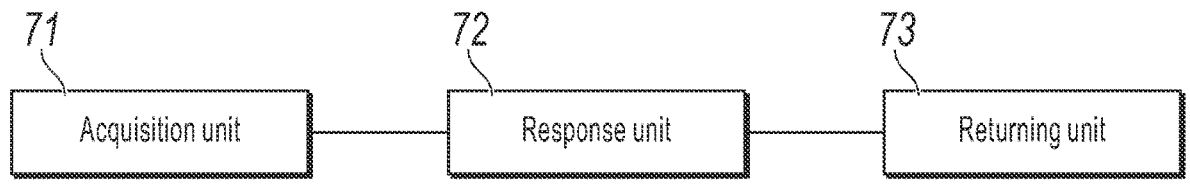
FIG. 7 is a block diagram illustrating a data structure reading apparatus, according to some example embodiments.

Referring FIG. 7, in a software implementation, the data structure reading apparatus can include the following:

an acquisition unit 71, configured to enable a blockchain node in a blockchain network to obtain an invoking request for a first smart contract;

a response unit 72, configured to, in response to the invoking request, enable the blockchain node to run contract code included in the first smart contract to parse a data structure described by metadata included in a second smart contract and to characterize the data structure by using a computer programming language; and a returning unit 73, configured to enable the blockchain node to return the data structure characterized by the computer programming language to an initiator of the invoking request.

Optionally, the metadata is used to describe data included in the second smart contract.

Optionally, the computer programming language includes a language of a predetermined type or a language of a type indicated in the invoking request.

Optionally, the first smart contract is a system contract provided by a system function of the blockchain network.

Figure 8:
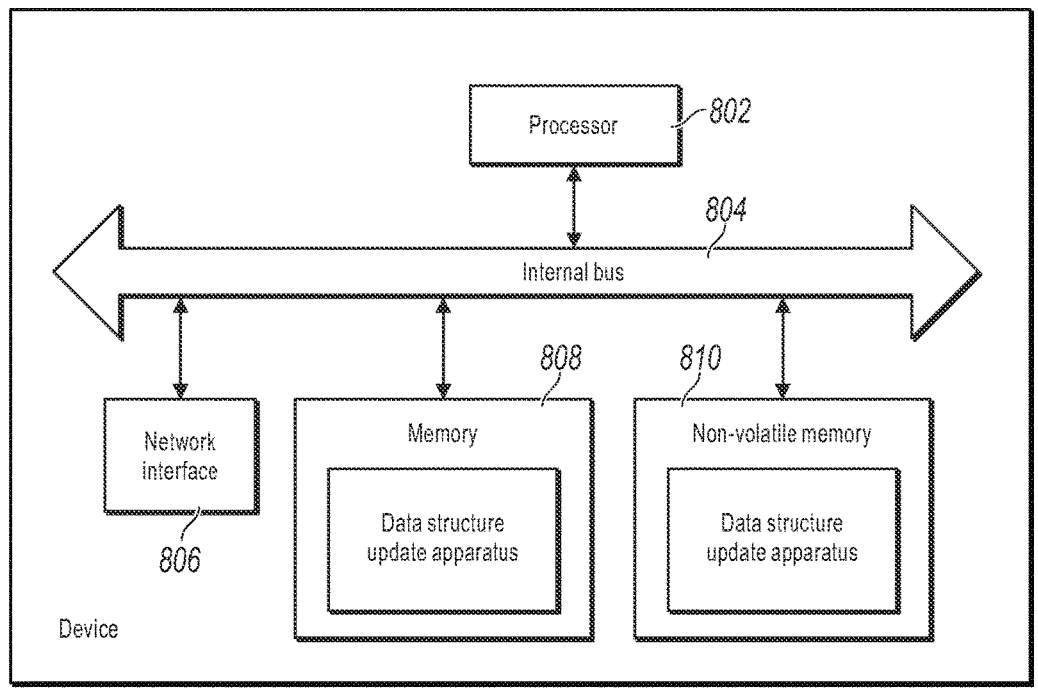
FIG. 8 is a schematic structural diagram illustrating another device, according to some example embodiments.

FIG. 8 is a schematic structural diagram illustrating a device, according to some example embodiments. Referring to FIG. 8, in terms of hardware, the device includes a processor 802, an internal bus 804, a network interface 806, a memory 808, and a non-volatile memory 810, and certainly can further include hardware needed by other services. The processor 802 reads a corresponding computer program from the non-volatile memory 810 to the memory 808 for running, and a data structure update apparatus is logically formed. Certainly, in addition to a software implementation, one or more embodiments of the present specification do not exclude another implementation, for example, a logic device or a combination of hardware and software. That is, an execution body of the following processing procedure is not limited to each logical unit, and can also be hardware or a logic device.

Figure 9:
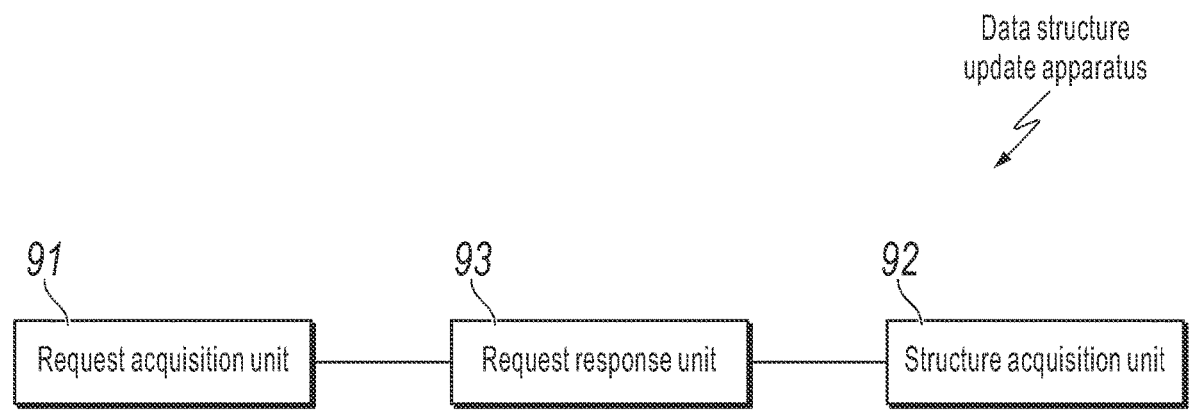
FIG. 9 is a block diagram illustrating a data structure update apparatus, according to some example embodiments.

Referring FIG. 9, in a software implementation, the data structure update apparatus can include the following:

a request acquisition unit 91, configured to enable a blockchain node in a blockchain network to obtain an invoking request for a first smart contract;

a structure acquisition unit 92, configured to enable the blockchain node to obtain an updated data structure that is based on a computer programming language; and a request response unit 93, configured to, in response to the invoking request, enable the blockchain node to run first contract code included in the first smart contract, where the first contract code is used to parse the updated data structure, and characterize the updated data structure as updated metadata that is based on a definition description language, so as to update pre-update metadata included in a second smart contract.

Optionally, metadata included in the second smart contract is used to describe data included in the second smart contract.

Optionally, the second smart contract includes second contract code, and the second contract code is used to parse the updated metadata to update a data structure of the data included in the second smart contract.

Optionally, the first smart contract is a system contract provided by a system function of the blockchain network.

Optionally, the first contract code is further used to compare a pre-update data structure corresponding to the pre-update metadata with the updated data structure to verify rationality of the updated data structure, where when the rationality of the updated data structure is successfully verified, the updated metadata is used to update the pre-update metadata.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPUs), an input/output interface, a network interface, and a memory.

The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by a computing device. Based on the description in the present specification, the computer-readable medium does not include transitory computer-readable media (transitory media), for example, a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or can be advantageous.

Terms used in one or more embodiments of the present specification are merely used to describe specific embodiments, and are not intended to limit the one or more embodiments of the present specification. The terms "a" and "the" of singular forms used in one or more embodiments of the present specification and the appended claims are also intended to include plural forms, unless otherwise specified in the context clearly. It should also be understood that, the term "and/or" used here indicates and includes any or all possible combinations of one or more associated listed items.

It should be understood that although terms "first", "second", "third", etc. can be used in one or more embodiments of the present specification to describe various types of information, the information is not limited to these terms. These terms are only used to differentiate between information of the same type. For example, without departing from the scope of one or more embodiments of the present specification, first information can also be referred to as second information, and similarly, the second information can be referred to as the first information. Depending on the context, for example, the word "if" used here can be explained as "while", "when", or "in response to determining".

The previous descriptions are only example embodiments of one or more embodiments of the present specification, but are not intended to limit the one or more embodiments of the present specification. Any modification, equivalent replacement, improvement, etc. made without departing from the spirit and principle of the one or more embodiments of the present specification shall fall within the protection scope of the one or more embodiments of the present specification.

What is claimed is:

1. A computer-implemented method, comprising:
    obtaining, by a blockchain node in a blockchain network, an invoking request for a first smart contract based on receiving a data structure update transaction, wherein the data structure update transaction i) is used to change data structure of a set of data included in a second smart contract, and ii) comprises a first input parameter indicating an updated data structure, wherein the second smart contract comprises pre-update metadata and the set of data, the set of data being in a first data structure prior to the data structure update transaction, the pre-update metadata being metadata of the set of data prior to the data structure update transaction;
    obtaining, by the blockchain node from the data structure update transaction, the updated data structure that is based on a computer programming language and indicated by the first input parameter;
    running, by the blockchain node, first contract code comprised in the first smart contract, comprising:
        parsing the updated data structure; and
        converting the updated data structure characterized by the computer programming language into updated metadata characterized by a definition description language;
    invoking, by the blockchain node through the first smart contract, the second smart contract using the updated metadata as a second input parameter for invoking the second smart contract; and
    running, by the blockchain node, second contract code in the second smart contract using the second input parameter indicating the updated metadata, comprising:
        replacing the pre-update metadata included in the second smart contract with the updated metadata that is characterized by the definition description language and indicated by the second input parameter;
        parsing the updated metadata in the second smart contract to obtain a parsing result; and
        updating the first data structure of the set of data in the second smart contract into a second data structure based on the parsing result, wherein the second data structure is i) described by the updated metadata indicated by the second input parameter and ii) corresponding to the first input parameter, indicating the updated data structure, of the data structure update transaction.

2. The computer-implemented method of claim 1, wherein the pre-update metadata comprised in the second smart contract describes the set of data comprised in the second smart contract prior to the data structure update transaction.

3. The computer-implemented method of claim 1, wherein the first smart contract is a system contract provided by a system function of the blockchain network.

4. The computer-implemented method of claim 1, wherein the first contract code is further used to compare the first data structure corresponding to the pre-update metadata with the updated data structure to verify that the updated data structure does not cause a data conflict in the set of data included in the second smart contract, wherein when the updated data structure does not cause a data conflict in the set of data included in the second smart contract, the updated metadata is used to replace the pre-update metadata.

5. The computer-implemented method of claim 1, wherein the updated data structure comprises data fields, a hierarchical relationship between the data fields, and a value relationship between the data fields.

6. The computer-implemented method of claim 1, further comprising:
    verifying, by the blockchain node, an initiator of the invoking request is within a predetermined group of users that have an invoking permission.

7. The computer-implemented method of claim 1, wherein updating the first data structure of the set of data in the second smart contract based on the parsing result comprises:

updating all data of the set of data included in the second smart contract based on the parsing result; or updating a subset of the set of data included in the second smart contract based on the parsing result.

8. A non-transitory, computer-readable medium storing one or more instructions executable by a computer system to perform one or more operations comprising:

obtaining, by a blockchain node in a blockchain network, an invoking request for a first smart contract based on receiving a data structure update transaction, wherein the data structure update transaction i) is used to change data structure of a set of data included in a second smart contract, and ii) comprises a first input parameter indicating an updated data structure, wherein the second smart contract comprises pre-update metadata and the set of data, the set of data being in a first data structure prior to the data structure update transaction, the pre-update metadata being metadata of the set of data prior to the data structure update transaction;

obtaining, by the blockchain node from the data structure update transaction, the updated data structure that is based on a computer programming language and indicated by the first input parameter;

running, by the blockchain node, first contract code comprised in the first smart contract, comprising:
parsing the updated data structure; and
converting the updated data structure characterized by the computer programming language into updated metadata characterized by a definition description language;

invoking, by the blockchain node through the first smart contract, the second smart contract using the updated metadata as a second input parameter for invoking the second smart contract; and running, by the blockchain node, second contract code in the second smart contract using the second input parameter indicating the updated metadata, comprising:
replacing the pre-update metadata included in the second smart contract with the updated metadata that is characterized by the definition description language and indicated by the second input parameter;
parsing the updated metadata in the second smart contract to obtain a parsing result; and
updating the first data structure of the set of data in the second smart contract into a second data structure based on the parsing result, wherein the second data structure is i) described by the updated metadata indicated by the second input parameter and ii) corresponding to the first input parameter, indicating the updated data structure, of the data structure update transaction.

9. The non-transitory, computer-readable medium of claim 8, wherein the pre-update metadata comprised in the second smart contract describes the set of data comprised in the second smart contract prior to the data structure update transaction.

10. The non-transitory, computer-readable medium of claim 8, wherein the first smart contract is a system contract provided by a system function of the blockchain network.

11. The non-transitory, computer-readable medium of claim 8, wherein the first contract code is further used to compare the first data structure corresponding to the pre-update metadata with the updated data structure to verify that the updated data structure does not cause a data conflict in the set of data included in the second smart contract, wherein when the updated data structure does not cause a data conflict in the set of data included in the second smart contract, the updated metadata is used to replace the pre-update metadata.

12. The non-transitory, computer-readable medium of claim 8, wherein the updated data structure comprises data fields, a hierarchical relationship between the data fields, and a value relationship between the data fields.

13. The non-transitory, computer-readable medium of claim 8, wherein the one or more operations further comprise:
verifying, by the blockchain node, an initiator of the invoking request is within a predetermined group of users that have an invoking permission.

14. The non-transitory, computer-readable medium of claim 8, wherein updating the first data structure of the set of data in the second smart contract based on the parsing result comprises:
updating all data of the set of data included in the second smart contract based on the parsing result; or
updating a subset of the set of data included in the second smart contract based on the parsing result.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a blockchain node in a blockchain network, an invoking request for a first smart contract based on receiving a data structure update transaction, wherein the data structure update transaction i) is used to change data structure of a set of data included in a second smart contract, and ii) comprises a first input parameter indicating an updated data structure, wherein the second smart contract comprises pre-update metadata and the set of data, the set of data being in a first data structure prior to the data structure update transaction, the pre-update metadata being metadata of the set of data prior to the data structure update transaction;
obtaining, by the blockchain node from the data structure update transaction, the updated data structure that is based on a computer programming language and indicated by the first input parameter;
running, by the blockchain node, first contract code comprised in the first smart contract, comprising:
parsing the updated data structure; and
converting the updated data structure characterized by the computer programming language into updated metadata characterized by a definition description language;
invoking, by the blockchain node through the first smart contract, the second smart contract using the updated metadata as a second input parameter for invoking the second smart contract; and
running, by the blockchain node, second contract code in the second smart contract using the second input parameter indicating the updated metadata, comprising:
replacing the pre-update metadata included in the second smart contract with the updated metadata that is characterized by the definition description language and indicated by the second input parameter;
parsing the updated metadata in the second smart contract to obtain a parsing result; and updating the first data structure of the set of data in the second smart contract into a second data structure based on the parsing result, wherein the second data structure is i) described by the updated metadata indicated by the second input parameter and ii) corresponding to the first input parameter, indicating the updated data structure, of the data structure update transaction.

16. The computer-implemented system of claim 15, wherein the pre-update metadata comprised in the second smart contract describes the set of data comprised in the second smart contract prior to the data structure update transaction.

17. The computer-implemented system of claim 15, wherein the first smart contract is a system contract provided by a system function of the blockchain network.

18. The computer-implemented system of claim 15, wherein the first contract code is further used to compare the first data structure corresponding to the pre-update metadata with the updated data structure to verify that the updated data structure does not cause a data conflict in the set of data included in the second smart contract, wherein when the updated data structure does not cause a data conflict in the set of data included in the second smart contract, the updated metadata is used to replace the pre-update metadata.

19. The computer-implemented system of claim 15, wherein the updated data structure comprises data fields, a hierarchical relationship between the data fields, and a value relationship between the data fields.

20. The computer-implemented system of claim 15, wherein the one or more operations further comprise:
  verifying, by the blockchain node, an initiator of the invoking request is within a predetermined group of users that have an invoking permission.

* * * * *